A. C. COX.
DRAFT DEVICE FOR HARROWS.
APPLICATION FILED OCT. 5, 1920. RENEWED APR. 18, 1922.
1,435,107.
Patented Nov. 7, 1922.
2 SHEETS—SHEET 1.
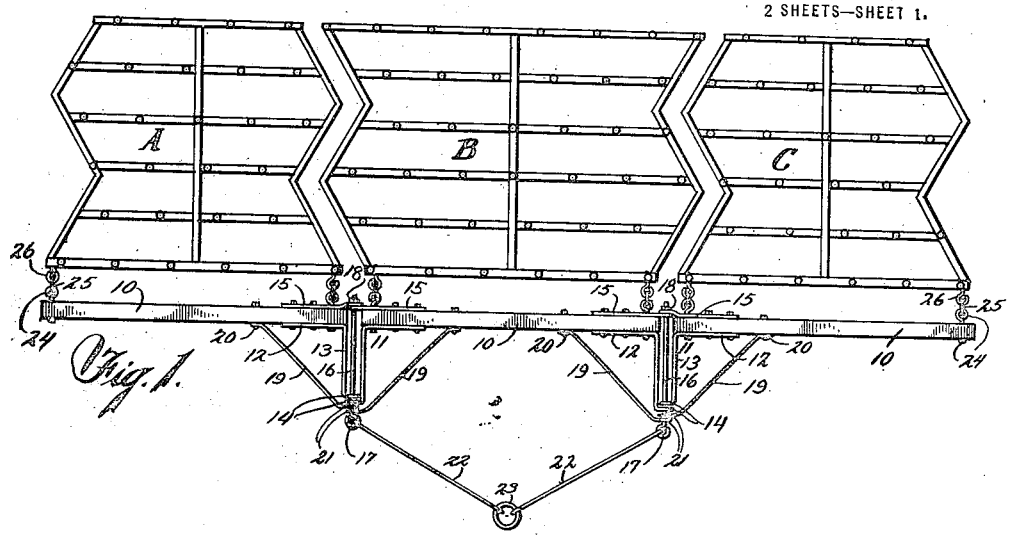
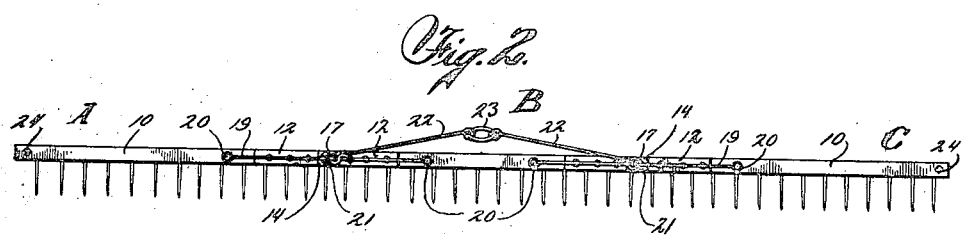
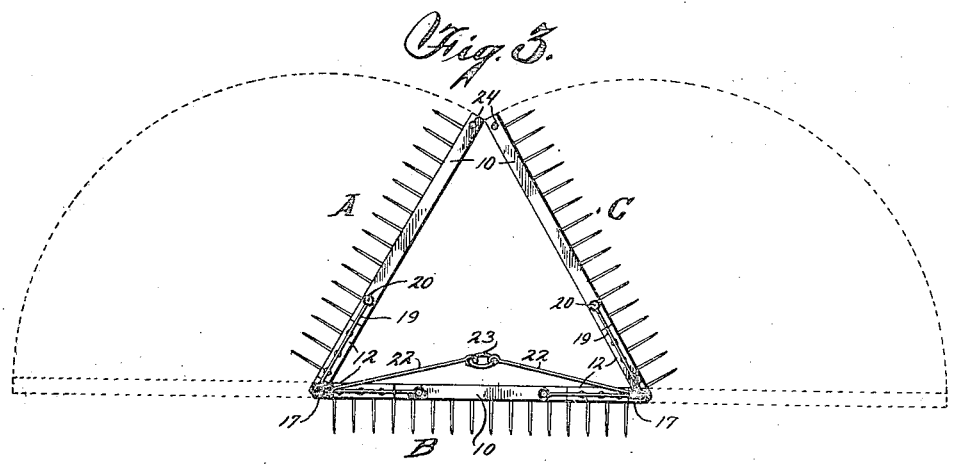
A. C. Cox
INVENTOR
BY Victor J. Evans
ATTORNEY

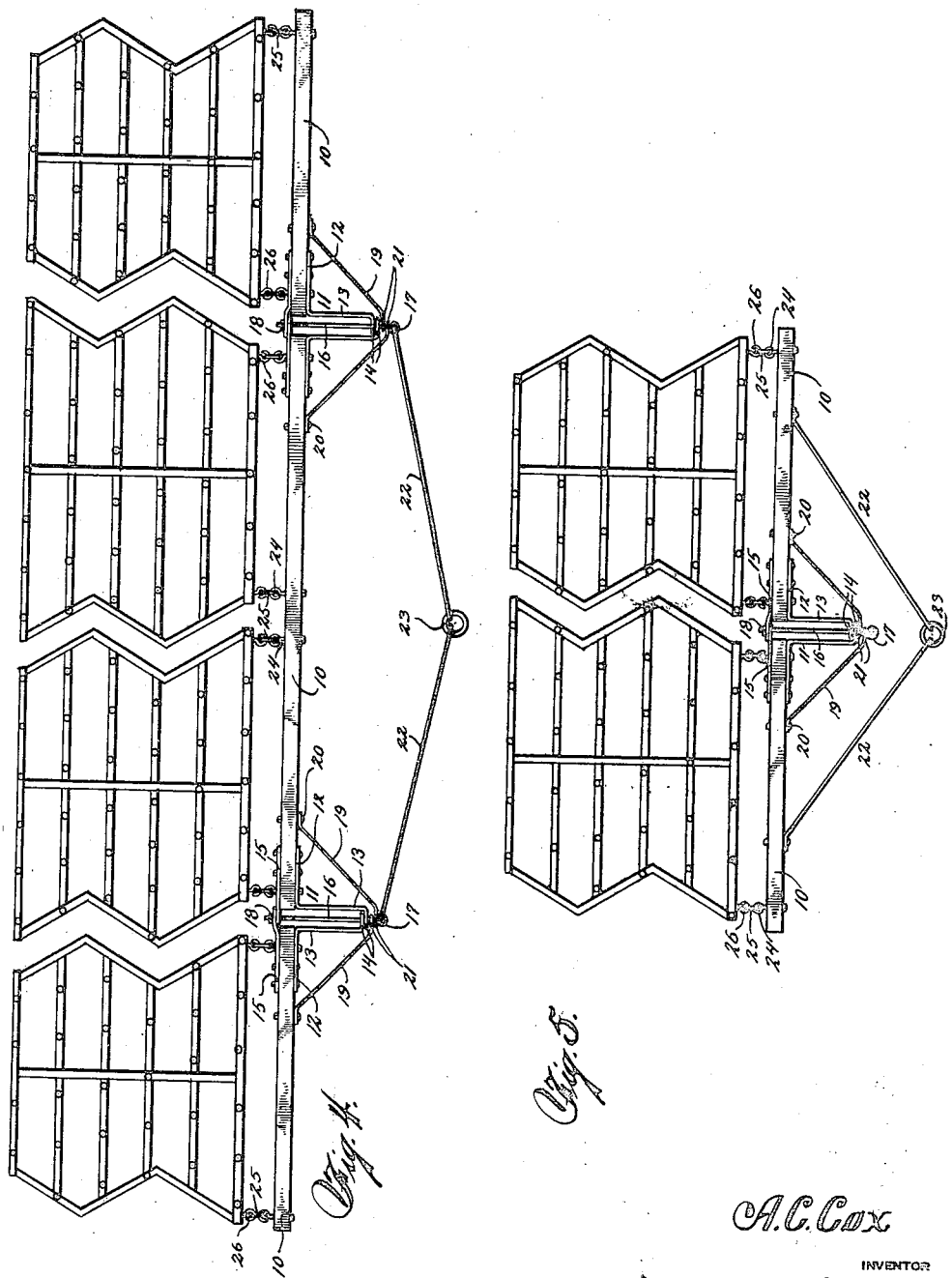

Patented Nov. 7, 1922.

1,435,107

UNITED STATES PATENT OFFICE.

ALONZO C. COX, OF CANTRIL, IOWA, ASSIGNOR OF ONE-HALF TO GEORGE A. CLARK, OF CANTRIL, IOWA.

DRAFT DEVICE FOR HARROWS.

Application filed October 5, 1920, Serial No. 414,786. Renewed April 18, 1922. Serial No. 555,226.

*To all whom it may concern:*

Be it known that I, ALONZO C. COX, a citizen of the United States, residing at Cantril, in the county of Van Buren and State of Iowa, have invented new and useful Improvements in Draft Devices for Harrows, of which the following is a specification.

This invention relates to draft devices, particularly to attachments for harrows and has for its object the provision of a draft device associated with a gang of harrows whereby they may all be drawn simultaneously abreast of one another, the device being furthermore so constructed as to permit the endmost harrow sections to be folded up to decrease the width of the gang so as to facilitate passage through a gateway or the like.

Another object is the provision of a device of this character which is so constructed that the harrow sections may follow any inequalities in the ground more closely than ordinarily as the draft device or hitch is formed in pivotally connected sections.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a plan view of my device, showing it associated with a gang of three harrows or harrow sections, Figure 2 is a front portion in normal position, Figure 3 is a front elevation with the end harrow sections swung upwardly, Figure 4 is a plan view showing the device as associated with four harrow sections, and Figure 5 shows the device associated with two harrow sections.

Referring more particularly to the drawings, the letters A, B and C designate the three sections of the gang harrow. In carrying out my invention I provide a draft device comprising a plurality of bars 10 arranged in end to end relation and provided at their adjacent ends with brackets 11. Each bracket includes an attaching portion 12 screwed or otherwise secured onto the bar, a portion 13 extending forwardly from the bar at right angles thereto and a laterally extending lug or ear 14 formed at the forward extremity of the portion 13 and provided with a hole. Secured upon the rear edges of the bars 10 opposite the brackets 11 are plates or strips 15 which are arranged in overlapping relation when the bars are assembled and the overlapping ends are likewise formed with holes.

The bars 10 are placed in end to end relation, as clearly shown, with the plates or strips 15 overlapping and with the ears 14 likewise overlapping. The different bars are then connected by means of rods 16 which extend through the registering holes in the ears 14 and plates 15 and each rod is formed at one end with a loop or eye 17 and at its rear end is threaded and provided with a nut 18 engaging the overlapping plates 15. By this means it will be seen that the bars 10 are pivotally connected so that each is movable with respect to the other in a vertical plane.

In order to brace the connections between the bars, key rods or wires 19 are provided which are secured at their ends upon adjacent bars, as indicated at 20, and which have their intermediate portions secured to the rods 16 adjacent the eyes 17, as by coiling, as indicated at 21. Connected with the eyes 17 are links 22 which converge and which have their other ends connected with a ring 23 to which any suitable draft device may be attached for pulling the harrows.

Secured upon the rear edges of the bars adjacent their ends are I bolts 24 which carry links or loops 25. These links or loops are attached to suitable snaps or the like 26 carried by the forward ends of the harrow sections A, B and C.

In the use of the device it will be seen that when the harrow sections are pulled along the ground by the application of the draft power to the ring 23, all the harrows will be dragged abreast of one another and owing to the fact that the bars 10 are pivotally connected it will be obvious that the harrow sections are capable of independent swinging movement so as to follow inequalities in the ground. When it is desired to pass through a gate or the like or in fact any narrow space, it is merely necessary that the outermost sections A and C be swung upwardly into converging position, as clearly shown in Figure 3 and it will be apparent that the engagement of the ends of the bars with one another when in this position will limit their swinging movement.

In Figure 4 I have shown my advice as associated with four harrow sections instead of three, the only difference in the construction being that the I bolts 24 must be differently arranged so as to provide for the extra section, two sections being carried by the intermediate bar 10.

In Figure 5 I have shown the device used in connection with only two harrow sections and in this event only two of the bars 10 are needed, each having a single harrow section connected therewith.

From the foregoing description and a study of the drawings it will be apparent that I have thus provided a very simply constructed draft device or hitch whereby a gang of harrow sections may be properly connected to permit relative swinging movement and which also permits folding of the harrow sections to facilitate passage through a constricted space.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A draft device of the character described comprising a plurality of bars arranged in slightly spaced end to end relation, brackets secured upon said bars at their meeting ends and each including an attaching portion secured to the bar, a forwardly extending portion and a lateral portion at the forward extremity of the forwardly extending portion, the lateral portions of the brackets being arranged in over-lapping relation, plates secured upon the opposite sides of the meeting ends of the bars and likewise arranged in over-lapping relation, rods passing through said lateral ends of the brackets and through the over-lapping ends of the plates and formed at their forward ends with eyes, draft links connected with said eyes, brace bars secured to said draft bars and provided with eyes receiving the rods forwardly of said brackets, and a plurality of chain members connected with said bars and adapted for connection with a series of harrow sections to be drawn.

In testimony whereof I affix my signature.

ALONZO C. COX.